United States Patent [19]
Colquist

[11] Patent Number: 4,489,676
[45] Date of Patent: Dec. 25, 1984

[54] CANINE CERVICAL JACKET

[75] Inventor: Russell W. Colquist, Livonia, Mich.

[73] Assignee: Bio-Medical Innovations, Inc., Okemos, Mich.

[21] Appl. No.: 550,830

[22] Filed: Nov. 14, 1983

[51] Int. Cl.[3] ..... A01K 15/04
[52] U.S. Cl. ..... 119/96; 54/79
[58] Field of Search ..... 119/96, 143; 54/79; 128/87 R

[56] References Cited

U.S. PATENT DOCUMENTS

| | | | |
|---|---|---|---|
| 3,584,436 | 6/1971 | Gulyas | 54/79 |
| 4,114,352 | 9/1978 | Horton et al. | 54/79 |
| 4,355,600 | 10/1982 | Zielinski | 119/143 |
| 4,385,592 | 5/1983 | Goldstein | 119/96 |

*Primary Examiner*—Hugh R. Chamblee
*Attorney, Agent, or Firm*—Charles W. Chandler

[57] ABSTRACT

A canine cervical jacket is disclosed comprising a fabric cover adapted to be mounted over the dog's back with a pair of openings for receiving the animal's legs. A removable, foam plastic body is disposed in the jacket and has a sufficient stiffness to prevent the dog from bending around to bite his hind quarters.

The jacket is useful either as a alternative to surgery, or as a post surgical aid.

The jacket has sleeves for receiving several elongated stiffener members along the dog's spine that prevent or restrict the dog from moving his head with respect to his body, but permit him to bend at the thoracic and lumbar area for feeding and the like.

7 Claims, 5 Drawing Figures

10
12
14
26
24
20
18
16

CANINE CERVICAL JACKET

BACKGROUND OF THE INVENTION

This invention is related to animal cervical jackets, and more particularly to a jacket having means for selectively restricting an animal's motion.

Doberman Pinschers sometimes experience a Type II cervical disk disease which causes pain and paralysis. The reason is that a portion of the spinal cord is traumatized, disrupting the nerve signal to the legs. One solution is to wrap the dog in a tight, elastic bandage to restrict his head motion. However, such a bandage is difficult to put on, to remove and to keep clean.

Some canine braces are illustrated in U.S. Pat. No. 4,385,592 which issued May 31, 1983 to Goldstein, and U.S. Pat. No. 4,286,547 which issued Sept. 1, 1981 to Neubauer, et al.

SUMMARY OF THE INVENTION

The broad purpose of the present invention is to provide a canine cervical jacket that permits the user to selectively control the dog's neck mobility and which can be easily applied, removed and machine washed. The preferred embodiment, which will be described in greater detail, comprises a jacket that mounts over the dog's back and neck and has a pair of sides which fold down beneath the dog's body. A pair of openings in the jacket receive the dog's front legs. A relatively stiff but resilient foam body is mounted in the jacket and has concave, tapered, forward, side edges which close around the dog's neck and a pair of sides that wrap around the dog's chest to locate the jacket on the dog. Velcro fasteners provide means for connecting the lower side edges together. The jacket body has sufficient stiffness to prevent the dog from chewing on his hind quarters but permits him sufficient motion to slightly bend to eat, drink, urinate, and defecate because the jacket does not restrict the dog's thoracic lumbar area.

A plurality of elongated plastic stiffeners may be mounted in the jacket along the dog's spine and the back of his neck. The stiffeners effectively limit the dog's dorsal, ventral and lateral motion.

The jacket is useful as an alternative to Type II disc surgery.

It is also useful during the post-operative convalescent period after the dog's cervical vertebrae have been fused by bone graft.

Thus the preferred embodiment of the invention provides means for selectively controlling the dog's head motion as well as a certain amount of lateral motion for either a non-surgical or a post-operative application.

Still further objects and advantages of the invention will be readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 1:
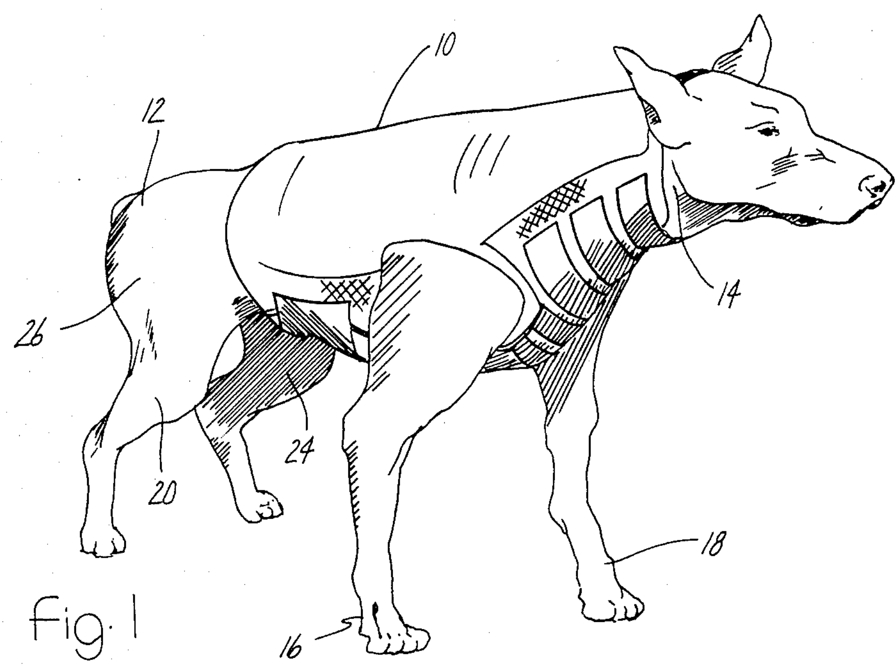
FIG. 1 illustrates a cervical jacket mounted on a dog in accordance with the present invention.

FIG. 1 illustrates a preferred cervical canine jacket 10 mounted on a Doberman Pinscher 12, to restrict the motion of the dog's neck 14. The dog has forward legs 16 and 18 and rear legs 20 and 24 supporting body 26.

Referring to FIGS. 2 to 5, the jacket comprises cover 28 and body 30.

Jacket cover 28 comprises an outer, flexible cover member 32 and an inner, flexible cover member 34. The two cover members are substantially identical to one another and are joined together along side edge 36, forward edge 38 and side edge 40. The rearward edges of the two cover members form overlapping flaps defining opening 42. Three Velcro fastening pads 44, 46 and 48 are mounted on the flaps so opening 42 may be closed by fastening the flaps together.

The forward portions of the two side edges are concave to accommodate the curvature of the dog's throat. The rear portion of the two side edges are convex to accommodate the curvature of the dog's chest area.

The cover also has a pair of spaced leg receiving openings 50 and 52 for receiving legs 16 and 18 of the animal.

Three Velcro fastener pads 54, 56 and 58 are attached to the outer cover along side edge 40. The opposite side edge of the cover has a flap means 60 with Velcro fastener pad means 62 engageable with pad 54 for fastening the forward end of the cover around the dog's neck beneath his throat. Three shorter flaps 64, 66, and 68 each carry a Velcro fastener means to engage pad 56 for fastening one side of the jacket midsection to the other. Flap 76 is connected to the side edge of the outer cover and has Velcro fastener 78 for engaging Velcro fastener pad 58 on the opposite side edge to provide means for fastening the two sides of the jacket cover together beneath the dog's chest.

Each Velcro fastener has a sufficient length and width so that the jacket accommodates the size of the dog as well as providing means for controlling the amount of restraint on the dog's motion by making the jacket either loose or tight.

Figure 4:
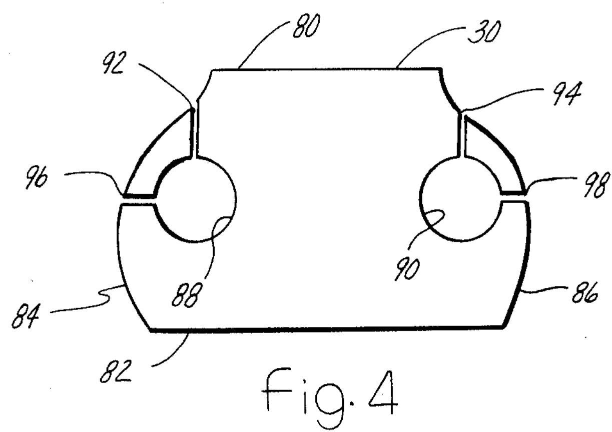
FIG. 4 is a plan view of the body removed from the cover.

Body 30 of the jacket is best illustrated in FIG. 4 and comprises a relatively stiff but resilient foam insert having a forward edge 80 with a length accommodating the diameter of the dog's neck, and a rearward edge 82 accommodating the diameter of the dog's midsection. The rearward edge is generally parallel to forward edge 80. A pair of convex side edges 84 and 86 extend from the rearward edge and terminate at openings 88 and 90 which accommodate the dog's legs. The body has a pair of tapered, concave, side edges 92 and 94 which extend from the forward edge toward openings 88 and 90. A pair of short elements 96 and 98 complete two openings 88 and 90. The rear side edges of the body are convex to accommodate the dog's chest area. The side edges are formed so as to oppose one another but not to overlap where mounted on the dog.

The body is normally inserted in the cover with the forward edge being disposed adjacent the forward edge of the cover. The two body openings fit around openings 50 and 52 of the cover with the short sections 96 and 98 being pushed in between leg-receiving openings of the cover and the side edges. The rearward edge of the body is disposed adjacent the flaps in such a manner that they can be wrapped around the body and fastened together with the Velcro fasteners.

Figure 5:
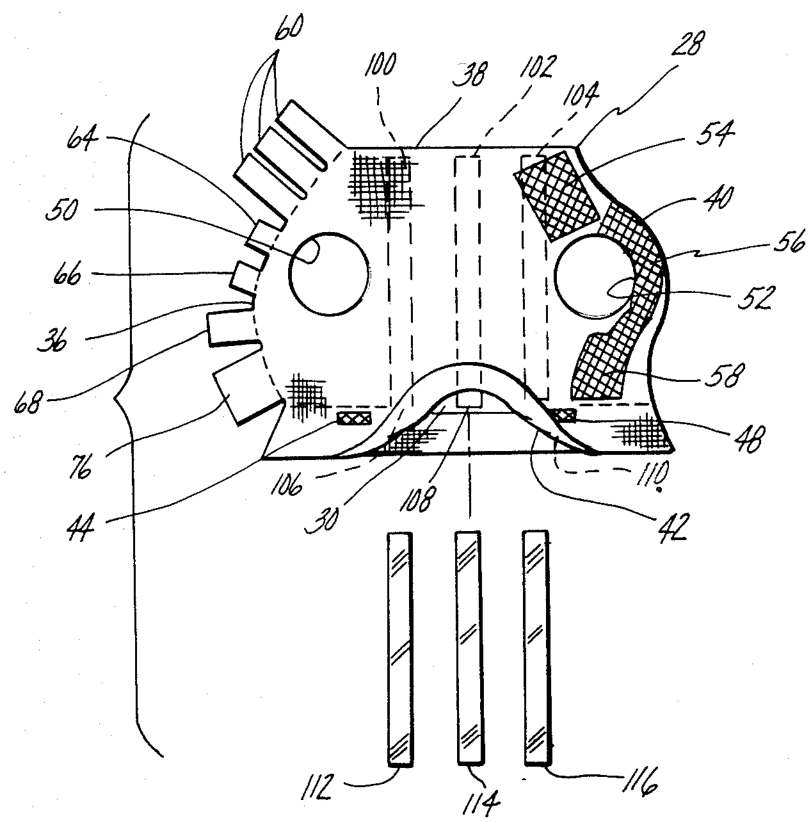
FIG. 5 is a view of the cover illustrating the stiffeners removed from their respective sleeves.
Figure 2:
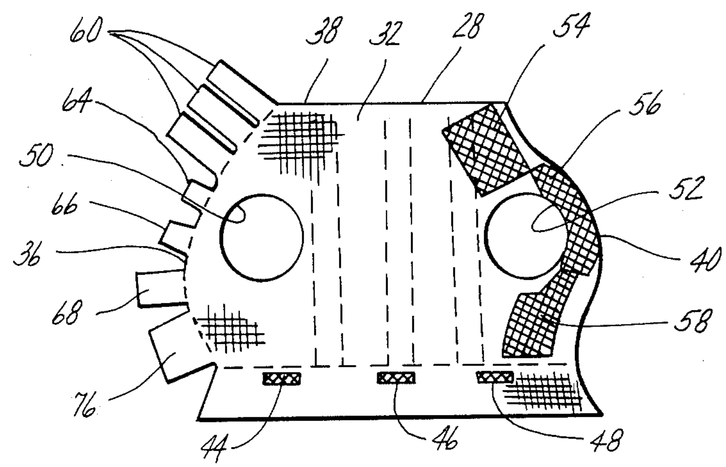
FIG. 2 is a plan view of the preferred jacket showing the outer surface of the cover.
Figure 3:
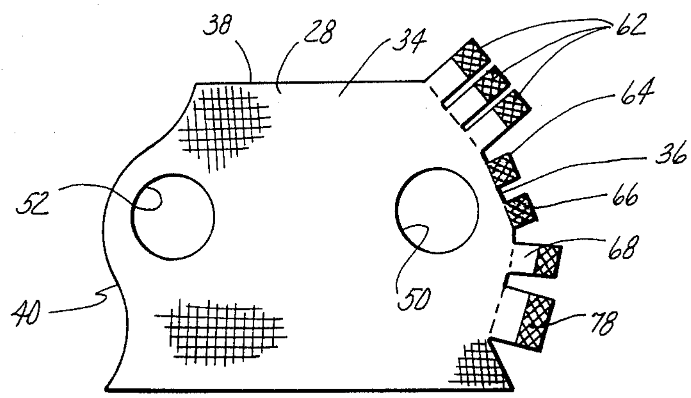
FIG. 3 is a plan view of the inner surface of the cover.

FIG. 5 illustrates the cover with one of the flaps raised to disclose three elongated sleeves 100, 102 and 104 having bottom openings 106, 108 and 110. The sleeves extend parallel to the cover's side edges. Three elongated plastic stiffeners 112, 114 and 116 are receivable in the sleeves so as to be disposed along the spinal column of the animal when the jacket is mounted on the dog. Velcro fasteners (not shown) are mounted on the sleeve openings for closing the openings when the stiffeners are mounted in position. The non-absorbent foam body provides a cushion between the dog's body and the stiffener.

The jacket can be employed without the stiffeners to provide a limited restriction on the dog's lateral motion to prevent it from biting on his hind quarters. It also provides a limited restriction to prevent the animal from moving his head, but permitting him to partially lower his head for eating purposes and the like.

When stiffeners 112, 114, and 116 are mounted in position, they provide a firm restriction against the dog's neck preventing him from moving his head with respect to his body thereby partially immobilizing him during the convalescent period after surgery on his vertebra. The stiffeners also provide a greater lateral restriction to the dog's lateral motion. If the top middle stiffener is removed, the dog has greater lateral motion. If the two side stiffeners are removed, the dog has greater ventral and dorsal movement. The jacket cover can be machine washed when body 30 and the stiffeners have been removed.

Having described my invention, I claim:

1. A canine cervical jacket, comprising:

a body member formed of a relatively flat, liquid resistant foam insert, the body member having a forward edge with a length accommodating the diameter of the animal's throat, a rearward, longer edge, generally parallel to the forward edge with a length accommodating the diameter of the animal's midsection, a pair of convex side edges extending forward from the rear edge, a pair of tapered concave side edges extending rearwardly from the forward edge of the body, and a pair of spaced, leg-receiving openings between the side edges; and a jacket cover comprising a pair of fabric members joined together about their side edges to form a cover for the body member, the cover having a pair of leg-receiving openings accommodating the openings in the body member, and fastener means mounted adjacent said side edges for releasably fastening together the side edges of the cover at such times as the jacket cover is mounted on the animal's back such that the side edges of the body are closely opposed, but not over lapping beneath the animals throat and chest.

2. A canine cervical jacket as defined in claim 1, including hook and loop fastener means mounted along the side edges of the jacket cover for fastening the side edges together and having a sufficient surface area to accommodate different size dogs.

3. A canine cervical jacket as defined in claim 1, including a plurality of elongated, stiffener members mounted in the jacket generally parallel to the side edges and adjacent the midsection of the jacket.

4. A canine cervical jacket as defined in claim 3, in which said elongated stiffener members are removable from the jacket cover.

5. A canine cervical jacket for an animal, comprising:

a body member formed of a flat liquid-resistant foam insert;

the body member having a forward edge with a length accommodating the diameter of the animal's throat;

the body having a rearward, longer edge generally parallel to the forward edge with a length accommodating the diameter of the animal's mid-section;

the body having a pair of convex side edges extending forward from the rear edge, a pair of tapered concave side edges extending rearwardly from the forward edge of the body and the body member, and a pair of spaced, leg-receiving openings between the side edges;

a jacket cover comprising a pair of fabric members joined together about their side edges to form a cover for the body member, the cover having side edges and a pair of leg-receiving openings accommodating the openings in the body member, and a rearward edge having an opening for removing the body member for cleaning; and fastener means mounted adjacent the jacket cover side edges for releasably fastening together the side edges of the cover at such times as the jacket cover is mounted on the animal's back such that the side edges of the body are closely opposed, but not overlapping beneath the animal's throat and chest.

6. A canine cervical jacket as defined in claim 5, including fastener means mounted on the jacket cover for closing the opening in the rearward edge.

7. A canine cervical jacket for an animal, comprising:

a body member formed of a relatively flat, liquid-resistant foam insert, the body member having a forward edge with a length generally corresponding to the circumference of the animal's throat, a rearward longer edge, generally parallel to the forward edge and having a length generally corresponding to the diameter of the animal's mid-section, a pair of side edges extending from opposite ends of the forward edge to opposite ends of the rearward edge, and a pair of spaced, leg-receiving openings between the side edges;

a jacket cover for the body member, the jacket cover having a width between a pair of side edges and a pair of leg-receiving openings accommodating the openings of the body member, the jacket cover's width being such that when the jacket cover is mounted on the animal's back, the side edges of the body member are closely opposed but not overlapping beneath the animal's throat and chest so as to form a shell enclosing the animal's upper body; and fastener means mounted adjacent the jacket cover side edges for releasably fastening one side edge of the jacket cover to the other side edge.

* * * * *